United States Patent [19]

Vanistendael

[11] Patent Number: 4,620,695

[45] Date of Patent: Nov. 4, 1986

[54] POWER CLAMPING APPARATUS

[75] Inventor: David M. Vanistendael, Washington, Pa.

[73] Assignee: Davan Industries, Washington, Pa.

[21] Appl. No.: 644,990

[22] Filed: Aug. 28, 1984

[51] Int. Cl.$^4$ .................................... B23Q 3/08

[52] U.S. Cl. .................................... 269/24; 269/32

[58] Field of Search .................................... 269/24, 27, 32

[56] References Cited

U.S. PATENT DOCUMENTS

| | | | |
|---|---|---|---|
| 3,605,569 | 9/1971 | Sessody | 269/32 |
| 4,351,516 | 9/1982 | Ersoy et al. | 269/32 |
| 4,508,327 | 4/1985 | Ersoy | 269/27 |

*Primary Examiner*—Frederick R. Schmidt

*Assistant Examiner*—Judy J. Hartman

*Attorney, Agent, or Firm*—Buell, Ziesenheim, Beck & Alstadt

[57] ABSTRACT

A power clamp assembly is provided having a base, a body rotatable on the base with spaced radial shelves of different heights, a hydraulic cylinder with piston in said body relatively rotatable therein, a hollow rod in said piston adjustable axially thereof and carrying a radial arm adapted to clamp a workpiece against a radial shelf on the body, a clamp structure for clamping said body and cylinder to the base at preselected positions and an inlet connected to a source of fluid pressure for introducing fluid pressure into said cylinder for moving the piston, rod and radial arm to clamping position.

25 Claims, 7 Drawing Figures

POWER CLAMPING APPARATUS

This invention relates to power clamping apparatus are particularly to hydraulic clamping apparatus for clamping a workpiece to a machine table.

Hydraulic clamping of the workpiece saves time in machine operations when changing workpieces. There have been hydraulic clamps used in machine work in the past, however, their use has been limited to long run jobs because of the necessity to build special fixtures for each job in the form of special hydraulic clamps. The cost of such fixtures can be justified only by the time saved in running the identical form of workpiece repeatedly over a long period. On short run jobs the fixture cost is not justified.

Conventional clamping usually involves the use of some blocks to rest the workpiece on, some side stops to position the workpiece and some hold down clamps along with step-blocks, studs and nuts. These parts are conventional and readily available for both large and small workpieces. The use of these conventional clamping systems is slow and awkward when a small quantity of workpieces is to be run on a machine and has been uneconomical for such use.

Hydraulic clamping as it existed prior to this invention usually requires a fixture, as mentioned above, to be built for each form of workpiece. Such fixtures must have all of the stops and work supports built into it, including a number of hydraulic cylinders each with a clamp mechanism that moves out of the work area when released. In such prior art hydraulic machines, the operator turns a lever or pushes a button to open or close all the clamps simultaneously. Such fixtures are expensive and time consuming to make but permit changing like workpieces in from five to fifteen seconds as compared to one to five minutes for conventional manual clamping systems.

The present invention eliminates the need for special fixtures for the vast majority of machine jobs. Moreover, even short run jobs, as little as one piece, can be set up and run more quickly than can be done with conventional methods. As a result, the power clamping mechanism of this invention has broad application to machine jobs which heretofor would not justify power or hydraulic clamping set ups.

The clamping system of the present invention incorporates the best of both the conventional manual and the prior art hydraulic systems of clamping. It can be set up, adjusted and ready for operation faster than the old manual step block method. It requires no special fixtures for each different job as did prior art hydraulic clamping systems but it is just as fast in operation, once set up. It is very simple and easy to change to a different workpiece shape or size.

I provide in the present invention a clamp assembly comprising a base member, a fastening arm on the base for fastening the same to a machine, a hydraulic cylinder on said base around said pivot point and spaced from the periphery of the base, retaining means on the base engageable with the cylinder to permit rotation of the piston on the base while holding said cylinder against removal, a piston movable axially in said hydraulic cylinder, a hollow rod in said piston axially adjustable therein, locking means in said hollow rod engaging said piston to releasably lock said rod in the piston, resilient means between the ball and locking means urging the locking means axially of said piston, a radially extending clamping arm on the end of said rod outside the piston, guide means between the cylinder and piston whereby the piston is caused to rotate around its axis as it reaches the extent of its movement out of the cylinder, a generally cylindrical body surrounding the cylinder and rotatable therearound, locking means on the cylinder for holding the body against the base to prevent relative rotation thereof, said body being spaced from the outer periphery of the base to provide a radial support flange on the base outwardly from the body, at least one radial projection on said body engaging said flange at the end adjacent the flange and having a support face on the opposite end substantially parallel to said flange and inlet means in the cylinder for receiving hydraulic fluid from a source thereof. Preferably the body has a plurality of radial projections spaced around its circumference and extending to different points intermediate the length of the body to provide different levels of work support. The hollow rod is preferably threadingly engaged axially of the piston interior and the locking means includes a positioning member fixed to the rod at one end and threadingly engaging a pocket member at the other end, said pocket member within and extending axially of the piston and having a threading fixed engagement with the piston. Preferably a lock screw at the end of the rod threadingly engages said rod and abuts the locking member to apply axial preload pressure thereon. The clamp arm is preferably provided with a lock screw engaging the rod opposite the radial arm to preload the arm opposite the ultimate clamping pressure. Preferably the guide means between the cylinder and piston is a pin on opposite sides of the piston running in antifriction bearings such as needle bearings. The resilient means is preferably a spring surrounding a spring guide resting on a ball in the center of the base.

In the foregoing general description of this invention I have set out certain objects, purposes and advantages of this invention. Other objects, purposes and advantages of the invention will be apparent from a consideration of the following description and accompanying drawings in which FIG. 1 is a side elevational view of a clamp according to this invention in place on a machine tool holding a workpiece (in chain line);

Figure 1:
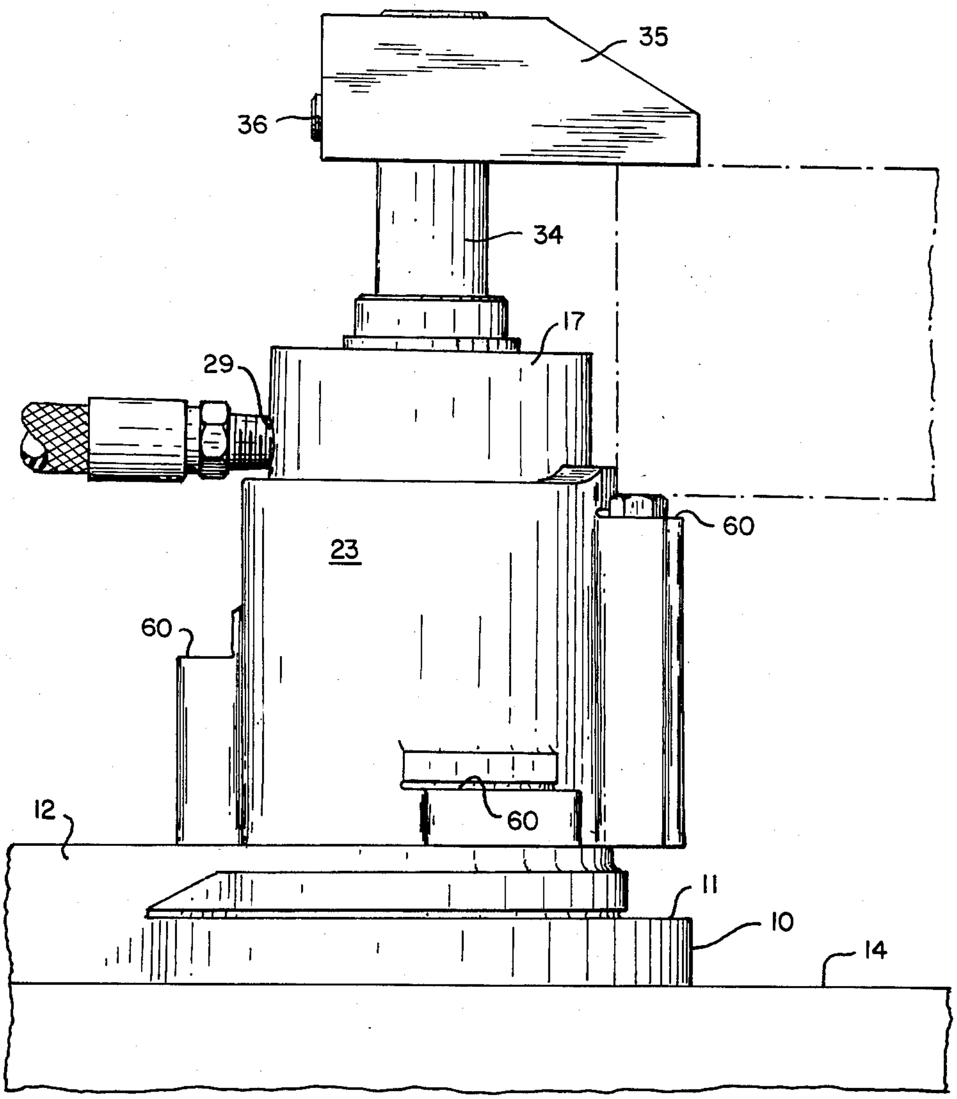
Figure 2:
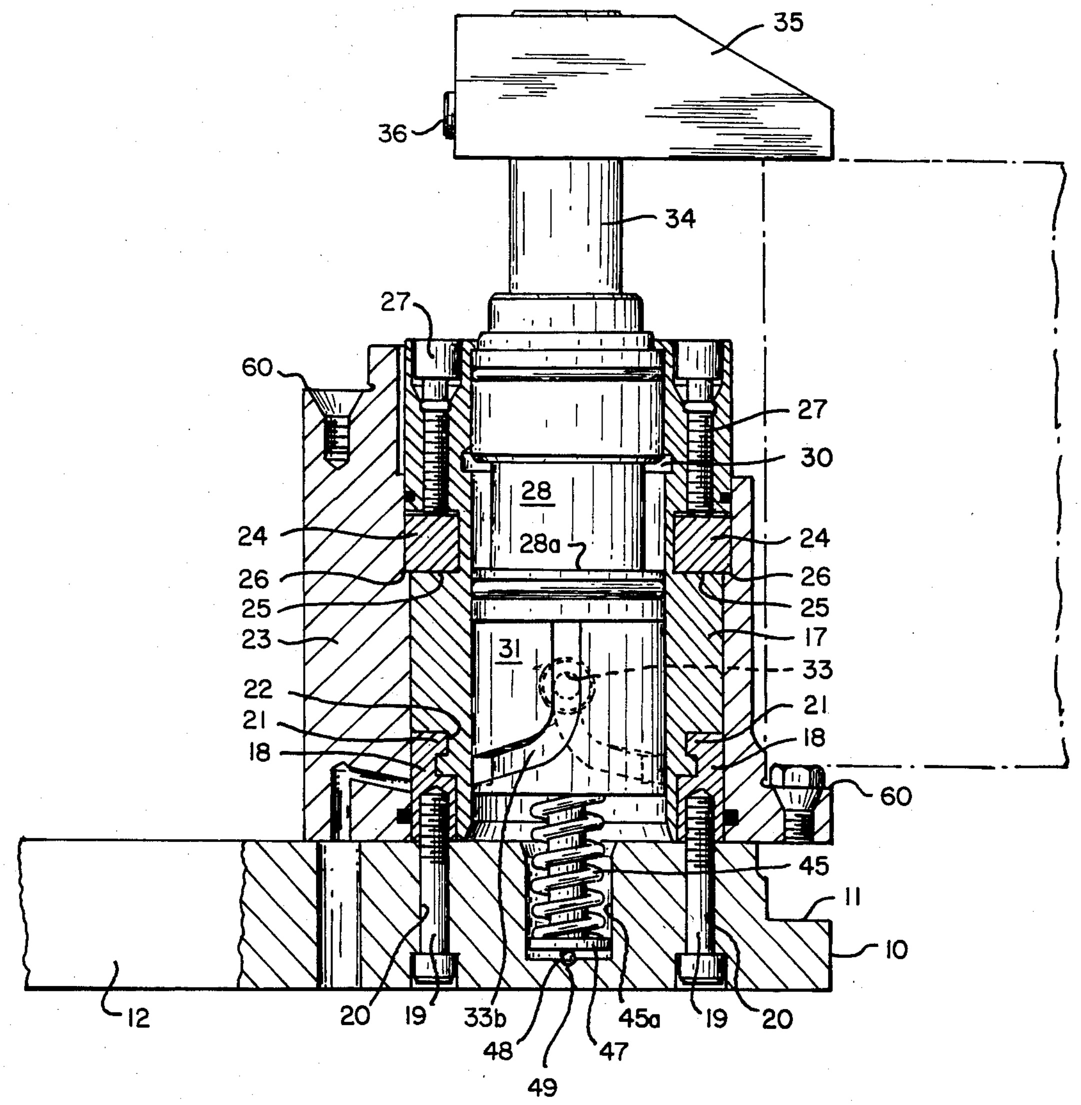
FIG. 2 is a vertical section through the base, body and cylinder of the clamp of FIG. 1 with a different workpiece in chain line.
Figure 3:
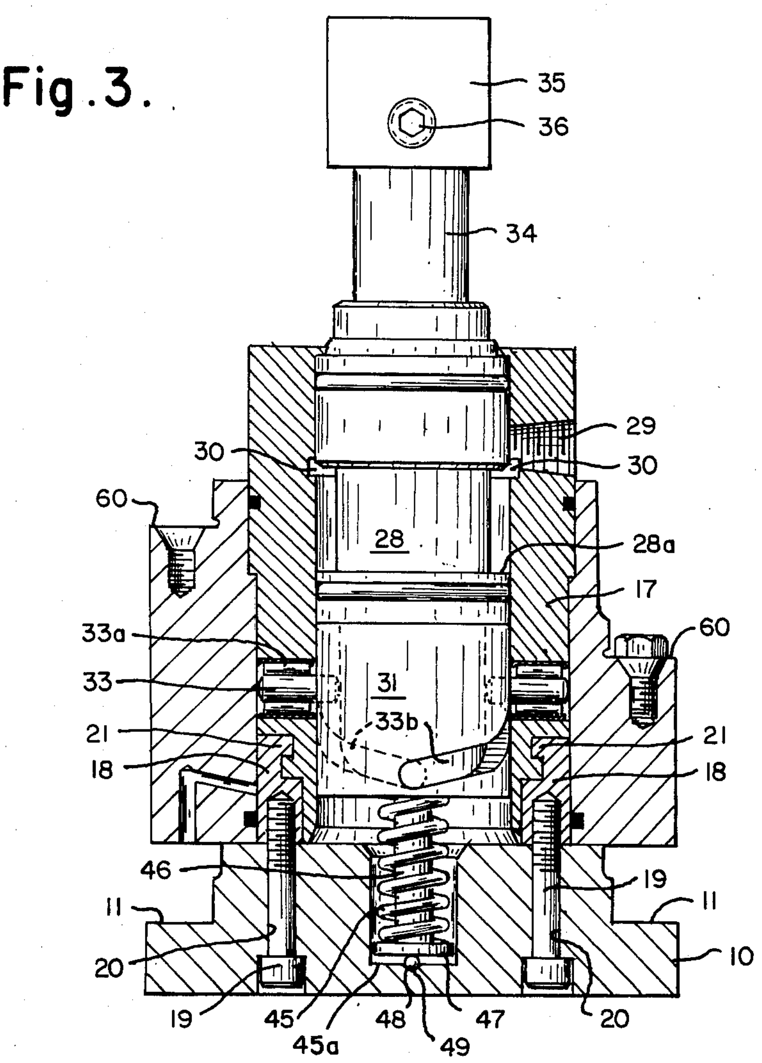
FIG. 3 is a partial vertical section as in FIG. 2 but at a 90° angle relative thereto.
Figure 5:
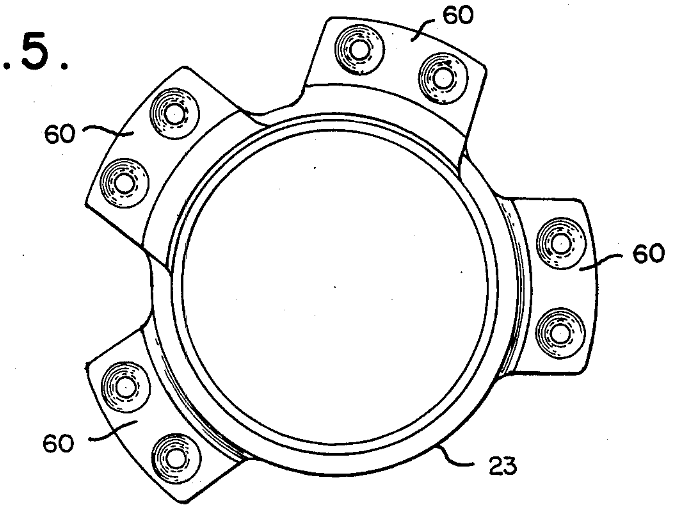
FIG. 5 is a top plan view of the body of the clamp of FIG. 4.
Figure 4:
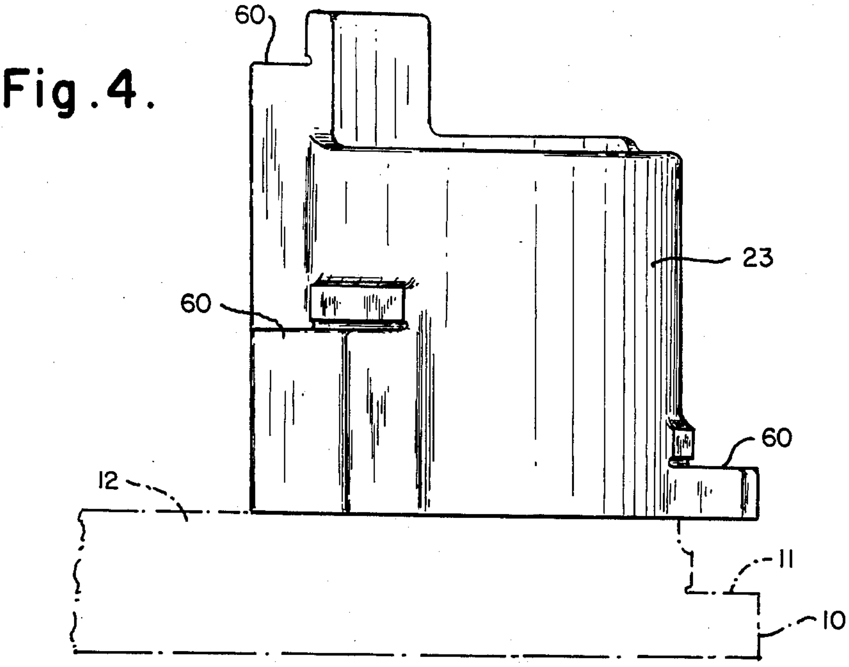
FIG. 4 is a side elevational view of the body of the clamp of FIG. 1.
Figure 6:
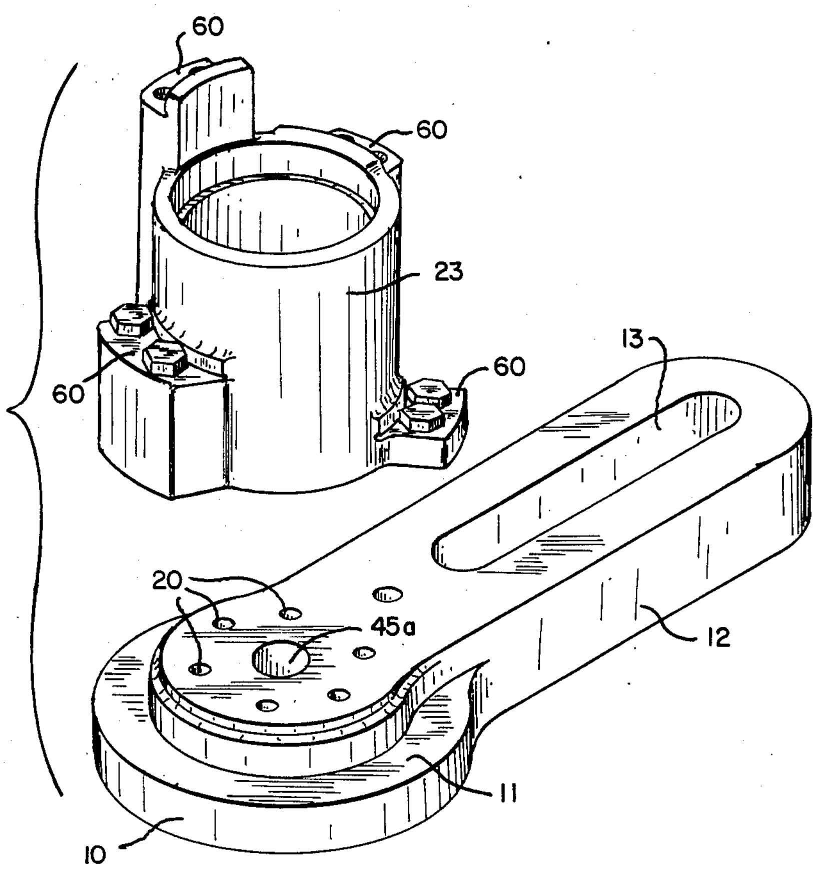
FIG. 6 is an isometric exploded view of the body and base of the clamp of FIG. 1.
Figure 7:
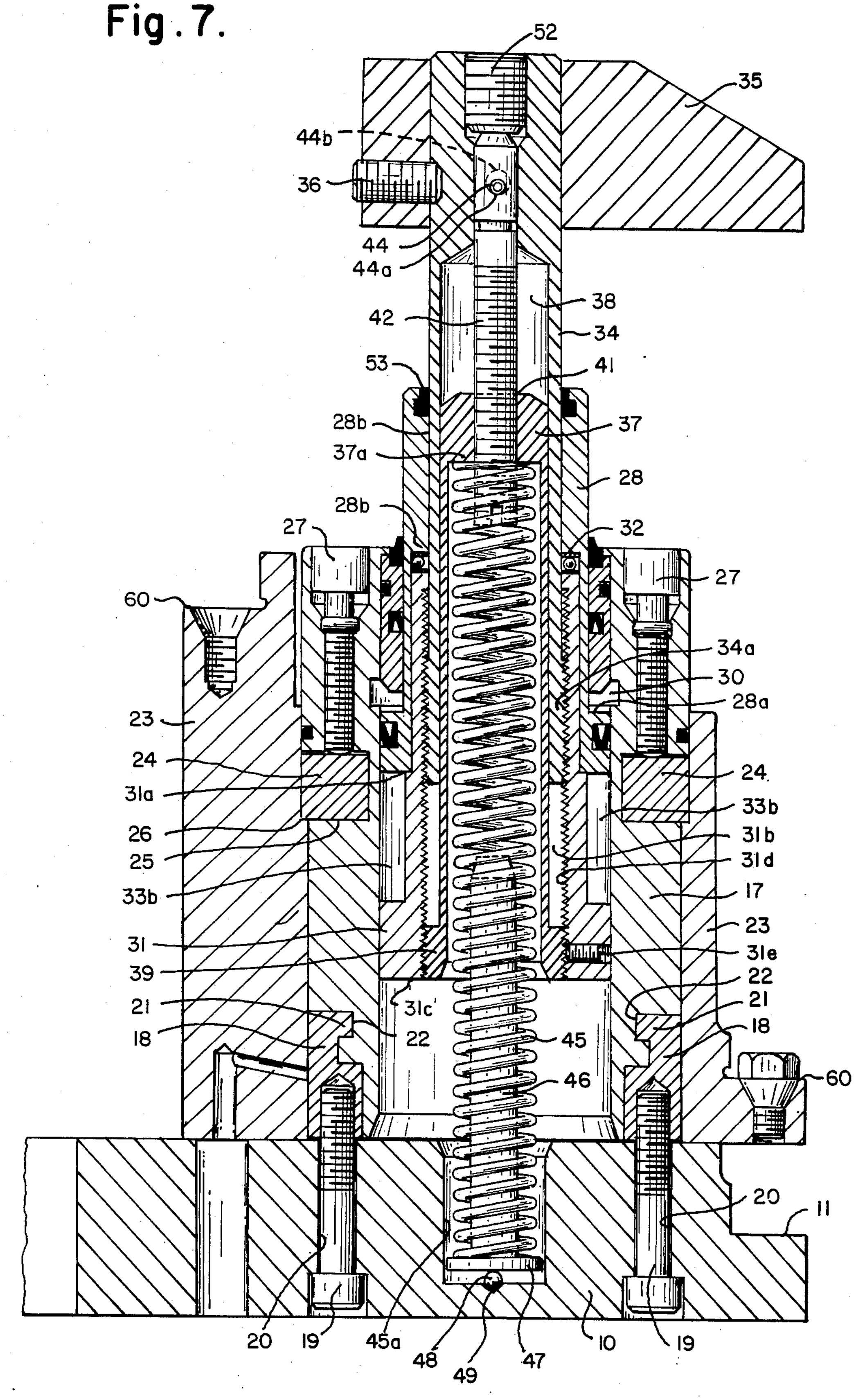
FIG. 7 is a vertical section through the clamp of FIG. 1.

Referring to the drawings, I have illustrated a power clamp according to this invention having a base 10 with a radial flange 11 extending outwardly from its circumference and a radial fastening arm 12 with slot 13 for receiving a fastening bolt or stud (not shown) running in a standard slotted guide (not shown) in a machine table 14.

A hydraulic cylinder 17 rests on base 10 and is held in freely rotatable position by clamp halves 18 and bolts 19 which extend through holes 20 in base 10 into threading engagement in the clamp halves. The clamp halves are provided with inwardly extending flanges 21 which engage in annular slot 22 in cylinder 17. A cylindrical body 23 surrounds cylinder 17 and is clamped into postion on base 10 by means of lock wedges 24 in groove 25 in the outer wall of cylinder 17. The lock wedges 24 are urged against a shoulder 26 on the body 23 by means of lock screws 27 threaded in the cylinder 17.

A main piston 28 is axially movable in cylinder 17 by fluid from a hydraulic source delivered through inlet 29 into chamber 30 against radial flange 28a on piston 28. A subpiston 31 is slidably held coaxially within the main piston 28, with the bottom of main piston 28 resting on a radial shoulder 31*a* on subpiston 31 and a thrust bearing 32 between the top of subpiston 31 and an inwardly extending radial shoulder 28*b* intermediate the ends of main piston 28. Guide pins 33 rotatably carried in needle bearings 33*a* in the wall of cylinder 17 extend radially inwardly on opposite sides of piston 28 and engage cam grooves 33*b* in the outer periphery of the subpiston 31.

Subpiston 31 is hollow along its axis to provide an axial bore 31*b* open and threaded at one end 31*c* and having a rod 34 threaded at one end 34*c* to engage threads 31*c* in bore 31*b*. The opposite end of rod 34 extending out of the opposite end 31*b* of the subpiston 31. A clamp arm 35 extends radially from the top of rod 34 at one side. A set screw 36 in clamp arm 35 opposite the arm itself engages the end of rod 34 and applies a preload pressure on arm 35. The opposite end of rod 34 is provided with threads 34*a* engaging threads 31*d* within the interior bore 31*c* of subpiston 31 which permit the rod 34 to be rotated and threadingly run into or out of the subpiston 31. A pocket member 37 is slidably inserted in an axial passage 38 in rod 34. The member 37 is provided at one end with a flange 39 threaded externally to engage threads 31*d* in the bore 31*b* in subpiston 31. Pocket member 37 has a radial flange at the bottom end which is threaded into the threaded end 31*c* of bore 31*b* until flush with end 31*c* and the pocket member 37 is fixed against further rotation by set screw 31*e* in the side wall of subpiston 31. The opposite end of member 37 is provided with a female threaded opening 41 which threadingly receives one end of a positioning screw 42 in axial passage 38 in rod 34.

A spring 45 extends into a pocket 45*a* in base 10 and bears against an inwardly extending flange 37*a* at the top of the pocket member 37 which is connected to subpiston 31 urging the subpiston 31 axially out of cylinder 17. A spring guide 46 extends axially within spring 45 and is provided with a flange 47 at one end on which spring 45 bears. The end of spring guide 46 having flange 47 in turn bears on a ball 48 centered in a center point depression 49 in the bottom of pocket 45*a*. A center lock screw 52 at the top of rod 34 locks the rod 34 against rotation in the subpiston 31*a* by jamming the threads at end 34*c* of rod 34 in threads 31*c* of bore 31*b*. The rod 34 extends up or down by loosening the central lock screw 52 and rotating the rod 34 so that the threads at the end 34*c* move up or down in threads 31*c* of bore 31*b*. It may be quickly locked at any height setting and any orientation with a simple one quarter turn or less of the lock screw 52. The lock screw is located at the top of the rod 34 so it is always accessible. The threaded portion 34*a* of the rod 34 is at the lower end where it is sealed from chips or dirt. The upper part is smooth and sealed by an O-ring 53 in the upper end of the piston bore 28*b*. The threaded portion is slightly larger in diameter than the upper portion and the subpiston threaded portion terminates some distance below the top of the subpiston 31. This arrangement serves two purposes.

1. The rod cannot be extended beyond the end of the threaded portion 31*c* of bore 31*b* which forms a thread limit. This prevents over extension which could result in thread damage when the load is applied.
2. The upper portion of the subpiston bore absorbs the side thrust created by the load and relieves the threads from carrying this side load.

The positioning screw 42 is secured to the rod 34 by a spring or roll pin 44. The positioning screw has a hole 44*a* which is a press fit for this spring or roll pin 44 while the hole 44*b* through the rod 34 is a loose fit for pin 44. As the rod is screwed up and down there may be some pitch error between the positioning screw 42 and pocket member 37 and between the subpiston 31 and rod 34. As the positioning screw 42 is connected to rod 34 by pin 44 as described above, it follows that screw 42 is driven for rotation through rod 34 by pin 44, the hole 44*b* in rod 34 being larger in diameter than pin 44 allows positioning screw 42 to float up or down slightly in hole 44*b* with respect to rod 34, thereby, preventing any binding action that would interfere with the free rotation of rod 34 which might result from slight irregularities in the threads of lock series 42 in threads of rod 34. Positioning screw 42, being driven by rod 34 through pin 44, remains at a more or less stable vertical position with respect to rod 34. This enables lock screw 52 to contact positioning screw 42 by a quarter turn or less of lockscrew 52. As lockscrew 52 is screwed down against positioning screw 42, the downward thrust is carried through the body of pocket member 37 and threaded flange 39 engaging threads 31*d* in bore 31*b* down to the lower portion of subpiston 31 by member 37. The upward thrust on rod 34 is transferred to the lower part of the rod 34 through the body of rod 34 and through the threads at the bottom of rod 34 into subpiston 31. The two threaded members 37 and 34 have forces in opposite directions and bind in the threads of subpiston bore 31*b*.

This locking method has the advantage that the locking pressures provide an upward force on rod 34 which is the same direction as the ultimate load force thus preventing any load forces from being absorbed by the positioning screw 42. The lower end of the spring 45 rests on a shoulder or flange 47 on the spring guide 46. The bottom of this spring guide 46 is a flat hardened surface which rests on a hard ball 48. The lower side of the ball rests in a conical cavity 49 in pocket 45*a*. As the subpiston 31 rotates it carries the spring 45 with it by the frictional engagement of flange 37*a* on the top end of spring 45 and rotation of flange 47 on ball 48. The torque of the spring 45 is transferred to spring guide 46 through frictional engagement of the bottom end of the spring on flange 47 on the spring guide 46 which rotates on the top of ball 48. This contact between spring guide 46 and ball 48 is in essence a point contact and results in a very low friction pivot point. The subpiston 31 travels up and down in cylinder 17 and also rotates in a helical manner for a portion of that travel. This is accomplished by the cam slots 33*b* in the lower end of subpiston 31. These slots are cut in a manner so as to have a straight portion and a curved portion leading into a helical portion. Pin 33 extending into this slot restrains the piston movement so that the piston must move in a manner dictated by the slot's shape. Pin 33 runs in needle bearing 33*a* so that pin 33 rotates in the slot thus reducing friction. Cylinder 17 rotates freely within housing 23 and clamp halves 18 when the clamp halves are tightened. This enables the hydraulic hose connection to inlet 29 to be positioned in any direction without disconnecting it. Clamp halves 18 secure the entire assembly to the base, while allowing complete rotation. Housing 23 is free to pivot around cylinder 17 and clamp halves 18 and contains work rest extensions 60 around its outer diameter which may be positioned by manually pivoting housing 23. These work rest extensions 60 are at various heights from the base 10. The distance between these heights are increments somewhat less than the adjustment range of rod 34. Therefore, various height work can be clamped by rotating the body 23 around until the ocrrect work rest is in the proper position. This provides a coarse adjustment. The fine adjustment is accomplished by adjusting rod 34 up or down. The base 10 is attached to the machine table with one bolt, not shown, extending into slot 13. The end of the base 10 to which the clamp assembly is attached, is provided with a stop or flange 11 around its outer diameter. This ledge has two purposes. It is the lowest work rest for the clamp and it is used for receiving additional clamps to the machine such as bolts or lugs (not shown) which engage the ledge to fasten it to the machine when necessary for severe service applications such as heavy objects and heavy machinery cuts which place an extra load on the apparatus above that normally encountered. After the base, body and cylinder are postioned they are locked together by means of lock screws 27. These screws 27 contact lock wedges 24 which contact body 23. Locking pressure forces body 23 down against base 10 and cylinder 17 upward. This upward pressure is transferred to screws 19 through clamp halves 18 so that upward pressure on cylinder 17 is the same direction as the clamping forces. Therefore, clamp screws 27 do not carry the clamping forces. Body 23 is firmly locked to base 10 which is the same direction as the clamp forces.

Clamp arm 35 is preferably provided with serrations on the working end, which is the end remote from screw 36. The purpose of these serrations is to help prevent the arm from slipping on the workpiece. This slipping, if it occurs, increases the rod deflection. Increased rod deflection causes more friction between the upper portion of piston 28 and cylinder 17 and results in less clamping force. Arm 35 is attached to rod 34 by means of set screw 36 which is positioned near the lower rear portion of arm 35. Rod 34 contains a recess into which screw 36 sets. This recess positions arm 35. When screw 36 is properly torqued it preloads the lower portion of arm 25. This preload eliminates most head deflection due to clamping forces.

In the foregoing specification, I have set out certain preferred practices and embodiments of this invention, however, it will be understood that this invention may be otherwise embodied within the scope of the following claims.

I claim:

1. A power clamp assembly comprising a base member having a periphery of generally circular shape, fastening means on said base for fastening said base to a machine, a central pivot point on said base, a ball rotatable in said pivot point, a hydraulic cylinder on said base around said pivot point spaced from the periphery of the base, retaining means on said base engaging said cylinder to permit rotation of said cylinder relatively to the base while holding said cylinder against removal, a piston movable axially in said hydraulic cylinder, a hollow rod of fixed length in said piston having one end extending out of said piston and axially adjustable with respect thereto, first locking means in said hollow rod engaging the piston to releasably lock said rod in the piston at a selected point on said rod, a radially extending clamping arm on said rod outside the piston, guide means between said cylinder and piston acting on the piston to rotate the piston around its axis as it reaches the extent of its movement out of the cylinder, a generally cylindrical body surrounding the hydraulic cylinder and extending from the base to a point intermediate the length of said cylinder and rotatable therearound, second locking means on the cylinder for holding the body against the base to prevent relative rotation thereof, said body being spaced from the outer periphery of the base to provide a radial support flange on the base extending outwardly from the body, at least one radial projection on said body engaging said flange at a portion adjacent the flange and having a support face on the opposite end substantially parallel to said flange and inlet means on said cylinder for receiving hydraulic fluid from a source thereof.

2. A power clamp as claimed in claim 1 wherein the retaining means on said base engaging said cylinder is a pair of clamp halves each having a radially inwardly extending flange engaging an annular groove in an outer cylinder wall, said cylinder and bolts extending through said base into said clamp halves exerting force coaxially of the cylinder to engage the cylinder tightly on the base.

3. A power clamp as claimed in claim 1 or 2 wherein the hollow rod is threadingly engaged axially of the piston interior and the first locking means includes a positioning member fixed to the rod at said one end and threadingly engaging a pocket member at the other end, said pocket member within and extending axially of the piston, said pocket member having a threading fixed engagement with the piston, and a lock screw threading engaging the rod and engaging the positioning means to apply locking pressure thereon.

4. A power clamp as claimed in claim 3 wherein the rod member is preloaded in a direction of ultimate clamp pressure by said lock screw.

5. A power clamp as claimed in claim 1 or 2 wherein the clamp arm has a lock screw engaging said other end of the rod whereby said arm is preloaded on the rod opposite an ultimate clamping load on the radially extending arm.

6. A power clamp as claimed in claim 3 wherein the clamp arm has a lock screw engaging said other end of the rod whereby said arm is preloaded on the rod opposite an ultimate clamping load on the radially extending arm.

7. A power clamp as claimed in claim 4 wherein the clamp arm has a lock screw engaging said other end of the rod whereby said arm is preloaded on the rod opposite an ultimate clamping load on the radially extending arm.

8. A power clamp as claimed in claim 1 or 2 wherein the guide means between said cylinder and piston is a pair of pins, one on each side of the piston running in anti-friction bearings in the cylinder and in slots having a helical portion in the piston.

9. A power clamp as claimed in claim 3 wherein the guide means between said cylinder and piston is a pair of pins, one on each side of the piston running in antifriction bearings in the cylinder and in slots having a helical portion in the piston.

10. A power clamp as claimed in claim 4 wherein the guide means between said cylinder and piston is a pair of pins, one on each side of the piston running in anti-friction bearings in the cylinder and in slots having a helical portion in the piston.

11. A power clamp as claimed in claim 5 wherein the guide means between said cylinder and piston is a pair of pins, one on each side of the piston running in anti-friction bearings in the cylinder and in slots having a helical portion in the piston.

12. A power clamp as claimed in claim 6 wherein the guide means between said cylinder and piston is a pair of pins, one on each side of the piston running in anti-friction bearings in the cylinder and in slots having a helical portion in the piston.

13. A power clamp as claimed in claim 7 wherein the guide means between said cylinder and piston is a pair of pins, one on each side of the piston running in anti-friction bearings in the cylinder and in slots having a helical portion in the piston.

14. A power clamp as claimed in claim 1 or 2 wherein the locking means in the hollow rod includes an axially extending pocket having a spring surrounding an axial spring guide and engaging the pocket at one end and an annular flange on the spring guide at the other, said spring guide rotatably running on the ball at the center point of the base.

15. A power clamp as claimed in claim 3 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

16. A power clamp as claimed in claim 4 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

17. A power clamp as claimed in claim 5 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

18. A power clamp as claimed in claim 6 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

19. A power clamp as claimed in claim 7 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

20. A power clamp as claimed in claim 8 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

21. A power clamp as claimed in claim 9 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

22. A power clamp as claimed in claim 10 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

23. A power clamp as claimed in claim 11 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

24. A power clamp as claimed in claim 12 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

25. A power clamp as claimed in claim 13 wherein the first locking means in the hollow rod includes an axially extending pocket having a spring surrounding an axial spring guide and engaging the pocket at one end and an annular flange on the spring guide at the other, said spring guide rotatably running on the ball at the center point of the base.

* * * * *